M. R. CRIVIANSKY.
ADJUSTABLE HORSE COLLAR.
APPLICATION FILED JUNE 6, 1917.
1,258,198.
Patented Mar. 5, 1918.
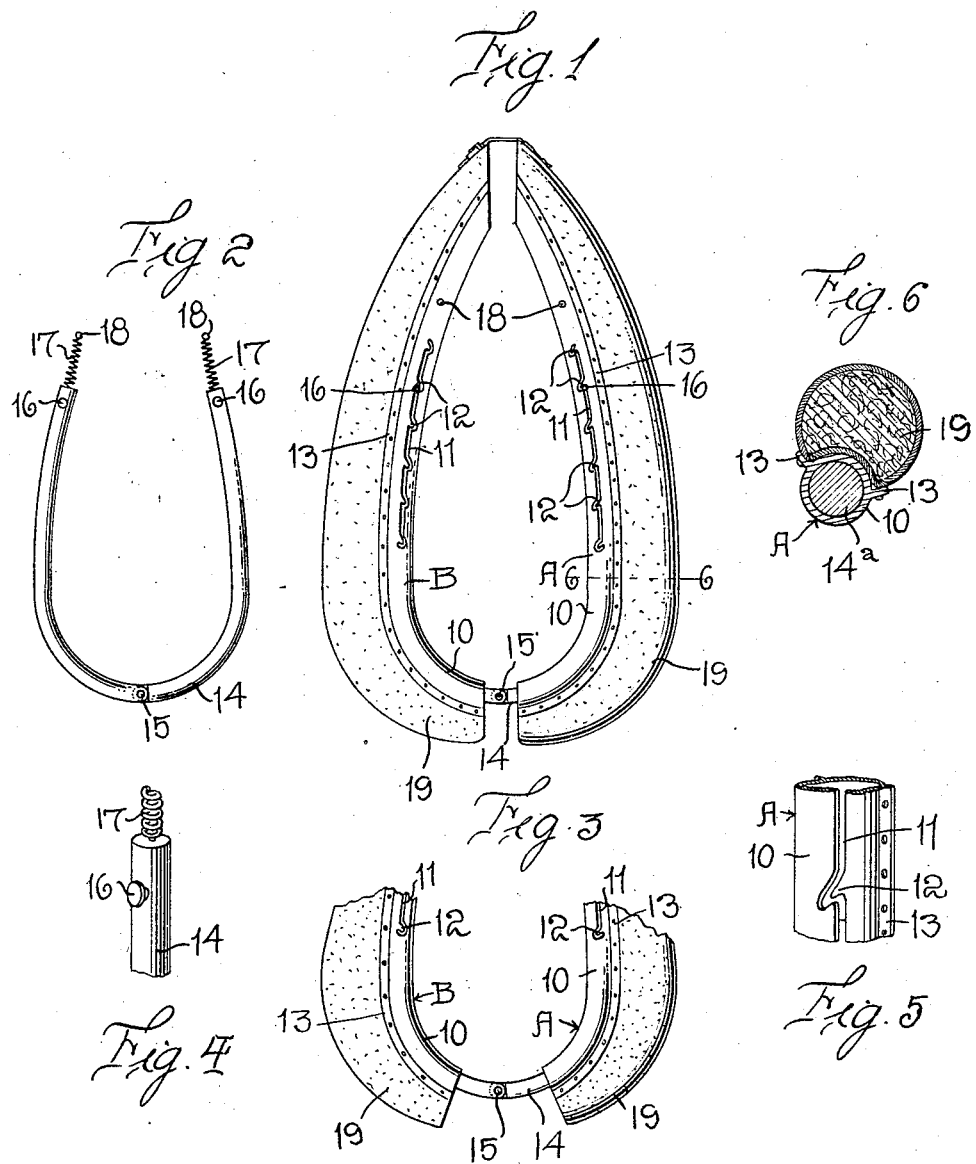
Inventor
MARGARET R. CRIVIANSKY
By Watson E. Coleman
Attorney

UNITED STATES PATENT OFFICE.

MARGARET R. CRIVIANSKY, OF GREAT FALLS, MONTANA.

ADJUSTABLE HORSE-COLLAR.

1,258,198.  Specification of Letters Patent.  Patented Mar. 5, 1918.

Application filed June 6, 1917. Serial No. 173,228.

*To all whom it may concern:*

Be it known that I, MARGARET R. CRIVIANSKY, a citizen of the United States, residing at Great Falls, in the county of Cascade and State of Montana, have invented certain new and useful Improvements in Adjustable Horse-Collars, of which the following is a specification, reference being had to the accompanying drawings.

This invention relates to horse collars, and particularly to horse collars which are adjustable to different size horses.

One object of the invention is to provide a horse collar which is very readily adjusted, both as to length and width, so that the collar may be fitted to the horse and also so that if the horse for whom the collar is designed grows fat or thin, the collar may be properly adjusted to suit.

A further object of the invention is to provide a horse collar of this character so constructed that it will not break at the lower end, as all collars do.

And another object is to provide a horse collar of this character very simple of construction and which may be cheaply made.

Other objects will appear in the course of the following description.

My invention is illustrated in the accompanying drawings, wherein:—

Figure 1 is an elevation of a horse collar;

Fig. 2 is an elevation of the yoke detached from the remainder of the collar:

Fig. 3 is a fragmentary section of the lower end of the collar showing the manner in which it is adjusted;

Fig. 4 is a perspective view of one end of the yoke;

Fig. 5 is a fragmentary perspective view of the slotted sleeve which forms the foundation upon which the padding is applied;

Fig. 6 is a cross-section on line 6—6 of Fig. 1.

The collar, as illustrated in Fig. 1, is formed in two sections A and B. Each of these sections comprises a metallic sleeve, designated 10, this sleeve being curved to conform to the general shape of the collar. Each of the sleeves 10 is formed on its front face with a longitudinally extending slot 11, this slot as shown clearly in Fig. 5 being formed at a plurality of points with offset portions 12, forming ratchet shoulders. Each of these sleeves is provided with flanges 13 or other means whereby the padding 19 may be attached to the sleeve.

Connecting the two sleeves at their lower ends is a curved yoke 14 formed in two sections hinged at their lower ends as at 15. Each yoke section 14 is formed at its upper end with an outwardly projecting button 16, the shank of which passes through the slot 11 and travels therein. Attached to the upper end of each yoke section is a coiled spring 17, the upper end of which is attached permanently within the corresponding sleeve 10, as by a pin 18 or other suitable means.

It will be seen that with this construction, the sections A and B may be shifted laterally with relation to each other and upon the yoke 14. This will stretch the springs 17 and the buttons 16 will travel within the slots 11 and will catch in the notches or offsets 12, in the manner plainly illustrated in Fig. 1, and thus the sections will be held in their adjusted positions. It is an easy matter to again adjust the sections A and B toward each other to contract the collar by manually shifting the buttons out of the offsets so that the buttons can travel upward in the slots 11. While I have illustrated the padding as being applied only upon that face of the sleeve section 10 which confronts the shoulders of the horse, it will be obvious that the padding may be applied entirely around the sleeve sections, if desired.

Having described my invention, what I claim is:—

1. A horse collar formed of a U-shaped yoke comprising two sections hinged to each other, the two sections together extending across the lower end of the horse collar and up the sides thereof, a pair of tubular sleeves inclosing the two sections of the yoke and slidable therealong, padding carried by the sleeves, and means for locking the sleeves in adjusted position upon the yoke.

2. A horse collar formed of a U-shaped yoke comprising two sections hinged to each other, a pair of sleeves mounted upon the yoke sections and slidable therealong, padding carried by the sleeves, and means for locking the sleeves in adjusted position upon the yoke.

3. A horse collar formed of two lateral sleeve sections, each of said sleeve sections being longitudinally slotted and each slot having a plurality of offset portions in its length, a U-shaped yoke extending into the lower ends of the sleeve sections and connecting said sleeve sections and formed with buttons projecting through said slots, and springs disposed in the sleeve sections and connected to the upper ends of the yoke and urging said yoke upward through the sleeve sections.

4. A horse collar formed of two lateral sleeve sections, each of said sleeve sections being longitudinally slotted and each slot having a plurality of offset portions in its length, a U-shaped yoke extending into the lower ends of the sleeve sections and connecting said sleeve sections and formed with buttons projecting through said slots, and springs disposed in the sleeve sections and connected to the upper ends of the yoke and urging said yoke upward through the sleeve sections, said yoke being formed in two sections hinged to each other at their lower ends.

In testimony whereof I hereunto affix my signature in the presence of two witnesses.

MARGARET R. CRIVIANSKY.

Witnesses:
E. L. CLARKE,
I. W. CHURCH.

Copies of this patent may be obtained for five cents each, by addressing the "Commissioner of Patents, Washington, D. C."